US008682020B2

(12) United States Patent
Wilk et al.

(10) Patent No.: US 8,682,020 B2
(45) Date of Patent: Mar. 25, 2014

(54) SPEAKER MAGNET THERMAL MANAGEMENT

(75) Inventors: Christopher Raymond Wilk, Sunnyvale, CA (US); Ruchir M. Dave, San Jose, CA (US); Sawyer I. Cohen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 13/253,900

(22) Filed: Oct. 5, 2011

(65) Prior Publication Data
US 2013/0089231 A1   Apr. 11, 2013

(51) Int. Cl.
*H04R 1/02* (2006.01)
*H04R 9/06* (2006.01)

(52) U.S. Cl.
USPC .......................................... 381/397; 381/396

(58) Field of Classification Search
USPC ................................................ 381/396, 397
See application file for complete search history.

(56) References Cited

U.S. PATENT DOCUMENTS

| 4,591,667 | A | 5/1986 | Hino et al. | |
|---|---|---|---|---|
| 4,752,963 | A | 6/1988 | Yamazaki et al. | |
| 5,894,524 | A | 4/1999 | Kotsatos et al. | |
| 7,254,248 | B2 * | 8/2007 | Johannsen et al. | 381/409 |
| 2008/0304694 | A1 * | 12/2008 | Hayashi | 381/397 |
| 2010/0157543 | A1 * | 6/2010 | Shohet et al. | 361/719 |
| 2010/0215209 | A1 | 8/2010 | Frasl | |
| 2011/0026757 | A1 | 2/2011 | Takahashi et al. | |
| 2011/0085694 | A1 * | 4/2011 | Lee | 381/397 |
| 2011/0116662 | A1 | 5/2011 | Yuze et al. | |
| 2011/0158459 | A1 | 6/2011 | Chen | |
| 2011/0182463 | A1 | 7/2011 | Lee | |
| 2011/0206230 | A1 * | 8/2011 | Fordham | 381/396 |

FOREIGN PATENT DOCUMENTS

| JP | 60 19393 | 1/1985 |
|---|---|---|
| KR | 20070010493 | 1/2007 |
| KR | 2008 0006962 | 1/2008 |

OTHER PUBLICATIONS

Ballou, Glen, et al., "Electroacoustic Devices: Microphones and Loudspeakers", Elsevier, 2009.
Wilk, Christopher R., "Speaker Having a Horizontal Former", Christopher Raymond Wilk, (Nov. 12, 2010).
European Search Report for Application No. EP12 18 5736 (date of completion of the search Jan. 25, 2013) mailed Feb. 6, 2013.

* cited by examiner

*Primary Examiner* — Brian Ensey
(74) *Attorney, Agent, or Firm* — Blakely, Sokoloff, Taylor & Zafman LLP

(57) ABSTRACT

In one embodiment, a mobile device including a magnet unit that is thermally coupled to the heat sink portion of a housing of the mobile device is disclosed. The mobile device comprises a speaker driver that includes a magnet unit, a housing having a heat sink portion that is made of a material having a high thermal conductivity, and a thermal component. The heat sink portion has a first face that is coupled to the speaker driver and a second face that is exposed to the exterior of the mobile device. The thermal component binds the speaker driver to the first face of the heat sink portion to create a cooling path from the magnet unit to the exterior of the mobile device. Other embodiments are also described.

21 Claims, 4 Drawing Sheets

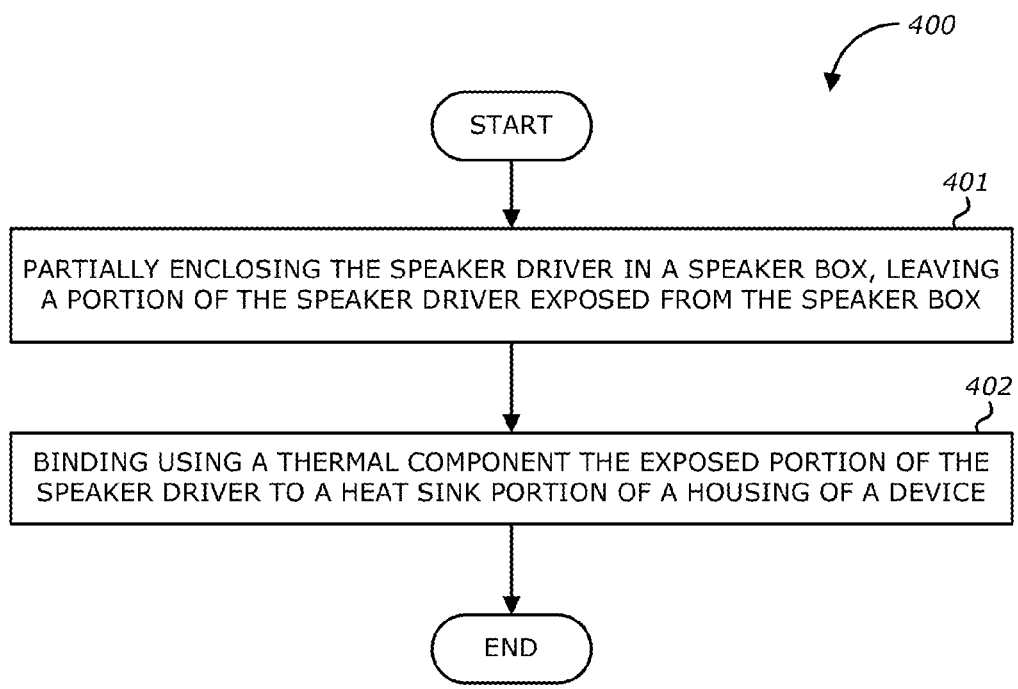

SPEAKER MAGNET THERMAL MANAGEMENT

FIELD

An embodiment of the invention relate generally to a speaker driver whose magnet unit is thermally coupled to a thermally conductive portion of an external housing of a mobile device in which the speaker driver is integrated.

BACKGROUND

Currently, a wide range of portable consumer electronics that are not dedicated to audio playback provide increasingly important audio capabilities. These portable consumer electronics may include, for example, smart phones, laptops, notebooks, tablet computers, and personal digital media players. These portable consumer electronics are often constrained in both x-y area and z-height or thickness such that the speaker driver included therein must be designed to meet the sizing constraints while providing adequate sound quality.

Typically, a speaker driver in a portable consumer electronic such as a smart phone includes a coil and a magnet unit that are completely enclosed in a plastic housing referred to as a speaker box, except of course for the acoustic output port. One disadvantage of this configuration is that the coil generates heat when audio is being played and the plastic housing traps the generated heat in the speaker driver. If the magnet unit exceeds a given temperature, the magnet unit may become demagnetized and this will result in terminal damage to the speaker driver. In order to address this problem, the magnet units in conventional speaker drivers are required to make use of high temperature grade magnets. However, high temperature grade magnets are unable to store as much flux density as the lower temperature grade magnets, leaving the conventional speaker that uses such a high temperature magnet lacking in sensitivity.

SUMMARY

In one embodiment of the invention, a speaker driver is contained in a speaker box, which in turn is installed within the external housing of a consumer electronic audio device, e.g., a mobile device. The housing has a heat sink portion that is made of metal or other material deemed "more thermally conductive" than the material of the speaker box. A thermally conductive component, which may be a thermally conductive grease, adhesive, or paste, is used to bind the speaker driver to the heat sink portion of the mobile device housing. The heat sink portion has one face coupled to the speaker driver and another face exposed to the exterior of the device. With such an arrangement, heat from the speaker magnet unit may be transferred using a cooling path that is created from the magnet unit to outside of the device. The magnet unit may therefore use a lower temperature grade magnetic material since it may be effectively cooled via the cooling path.

In one embodiment, the speaker driver and the speaker box form a side-firing speaker or a side-ported speaker. The speaker driver includes a diaphragm, a voice coil coupled to the diaphragm, and a yoke (also known as basket or a bottom plate). One portion of the back face of the yoke is exposed through an opening in the speaker box and is coupled to the thermally conductive portion (e.g., the heat sink portion) of the device housing through the thermal component.

Another embodiment is a method of manufacturing, where a speaker driver having a magnet unit is first installed within a speaker box, in which it is partially enclosed, leaving one portion of the driver exposed from the speaker box. The exposed portion of the speaker driver is then bound to a thermally conductive portion of the external housing of a consumer electronics audio device, using a thermal component.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings:

FIG. 4 shows a flow diagram of an example method of manufacturing the mobile device that includes a speaker driver having a magnet unit thermally coupled to a thermally conductive portion of the device.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
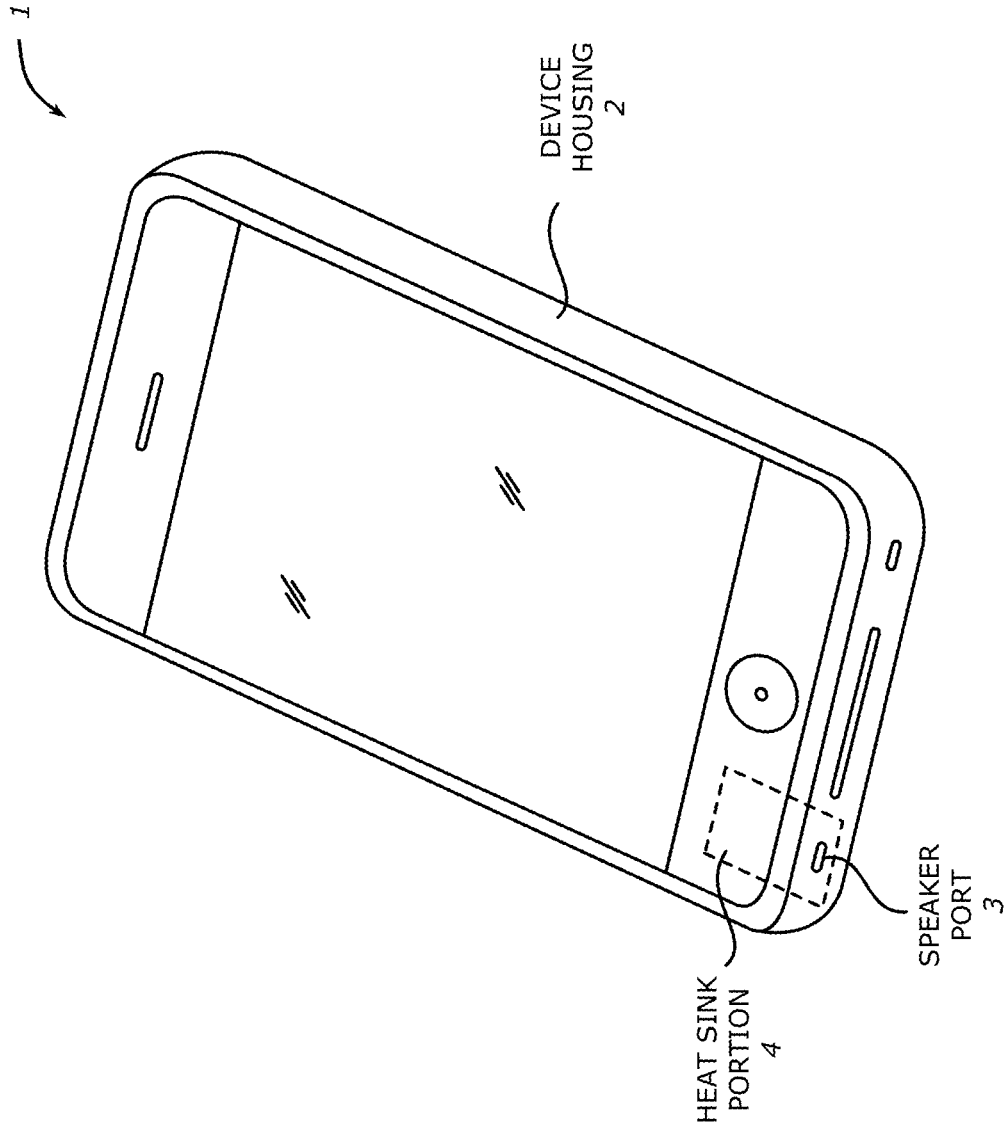
FIG. 1 illustrates one example of a portable consumer electronic device that is constrained in size and thickness and typically specifies speaker drivers in which an embodiment of the invention may be implemented.

FIG. 1 illustrates one instance of a portable consumer electronic device (or "mobile device") that is constrained in size and thickness and typically specifies speaker drivers in which an embodiment of the invention may be implemented. As shown in FIG. 1, the mobile device 1 may be a mobile telephone communications device or a smartphone such as an iPhone™ device, from Apple Inc. of Cupertino, Calif. The mobile device 1 may also be a tablet computer such as an iPad™ device, a personal digital media player such an iPod™ device or a notebook computer such as a MacBook Air™ device, which are all from Apple Inc. of Cupertino, Calif. The device housing 2 (also referred to as the external housing) encloses a plurality of electronic components of the device 1. For example, the device 1 may include electronic components such as a processor, a data storage containing an operating system and application software for execution by the processor, a display panel, and an audio codec providing audio signals to a speaker driver. As illustrated in FIG. 1, the back face of the device housing 2 has a heat sink portion 4 that is made of a material having a high thermal conductivity (e.g., aluminum). The material of the heat sink portion 4 is deemed to be "more thermally conductive" than the material of a speaker box that is integrated in the mobile device 1. The device housing 2 has a speaker port 3 (e.g., an acoustic port) that may be located on the bottom side of the device 1. While FIG. 1 illustrates a mobile device 1, it is understood that embodiments of the invention may also be implemented in a non-mobile device such as a compact desktop computer such as an iMac™, from Apple Inc. of Cupertino, Calif.

Figure 2:
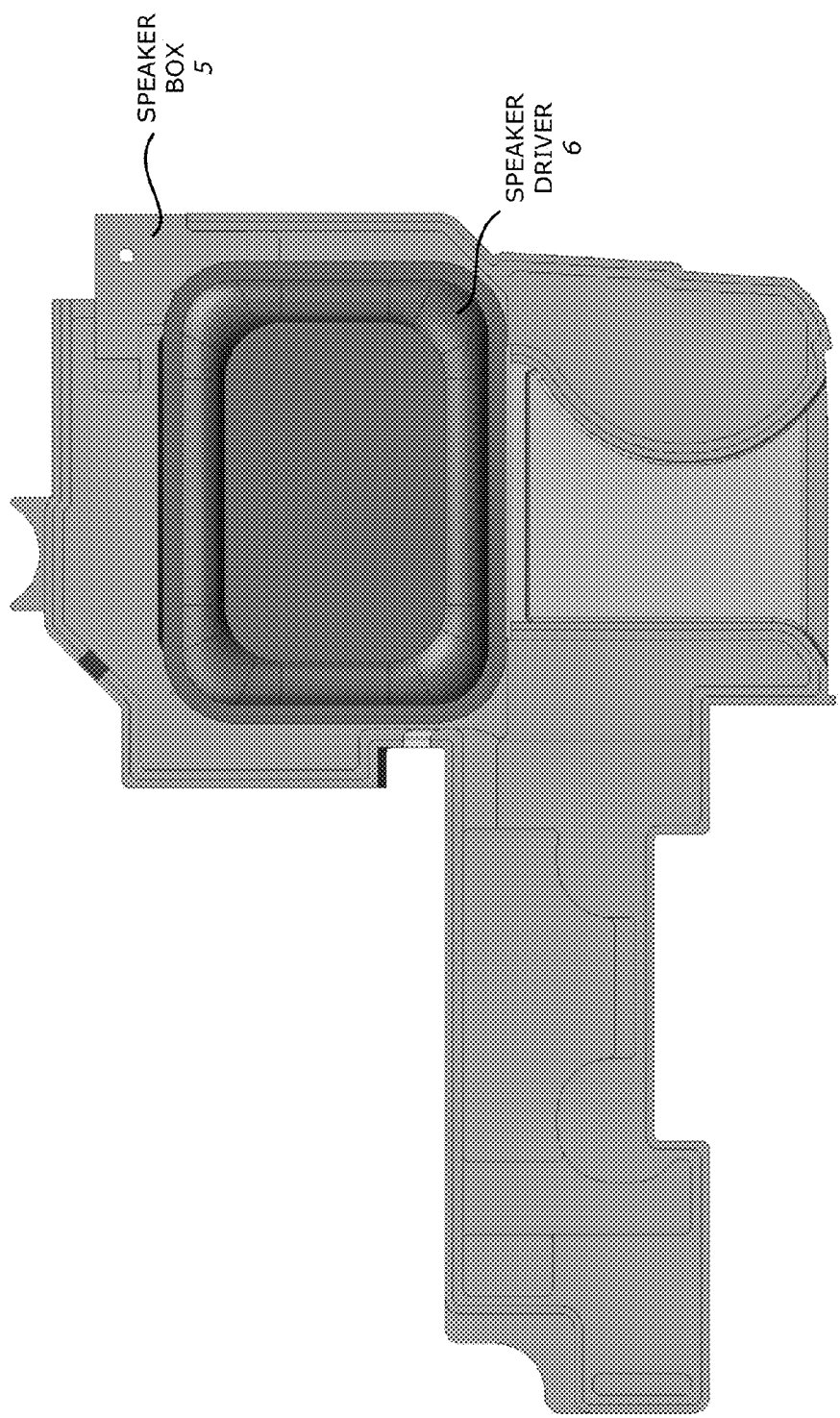
FIG. 2 shows a top view of one embodiment of the speaker box and the speaker driver.

FIG. 2 shows a top view of one embodiment of the speaker box and the speaker driver. In this embodiment, the speaker box 5 is an acoustic chamber that includes a speaker port (not shown) and partially encloses a speaker driver 6 which is formed in a disk shape. The speaker box 5 is made of a low-conductive or non-conductive material that is relatively inexpensive to precision manufacture (e.g., plastic). The speaker box 5 has an opening and one side of the speaker driver 6 is exposed from the opening. By only partially enclosing the speaker driver 6, the heat generated when audio is being played is not being trapped onto the speaker driver 6. Further, with one side of the speaker driver 6 being exposed, both the thickness of the speaker box 5 and the weight of the speaker box 5 are reduced. In some embodiments, the speaker box 5 and the speaker driver 6 form a side-firing speaker or a side-ported speaker. Thus, the sound travels in a direction perpendicular to the thickness of the speaker box 5, which is measured in the z-direction as illustrated in FIG. 3.

Figure 3:
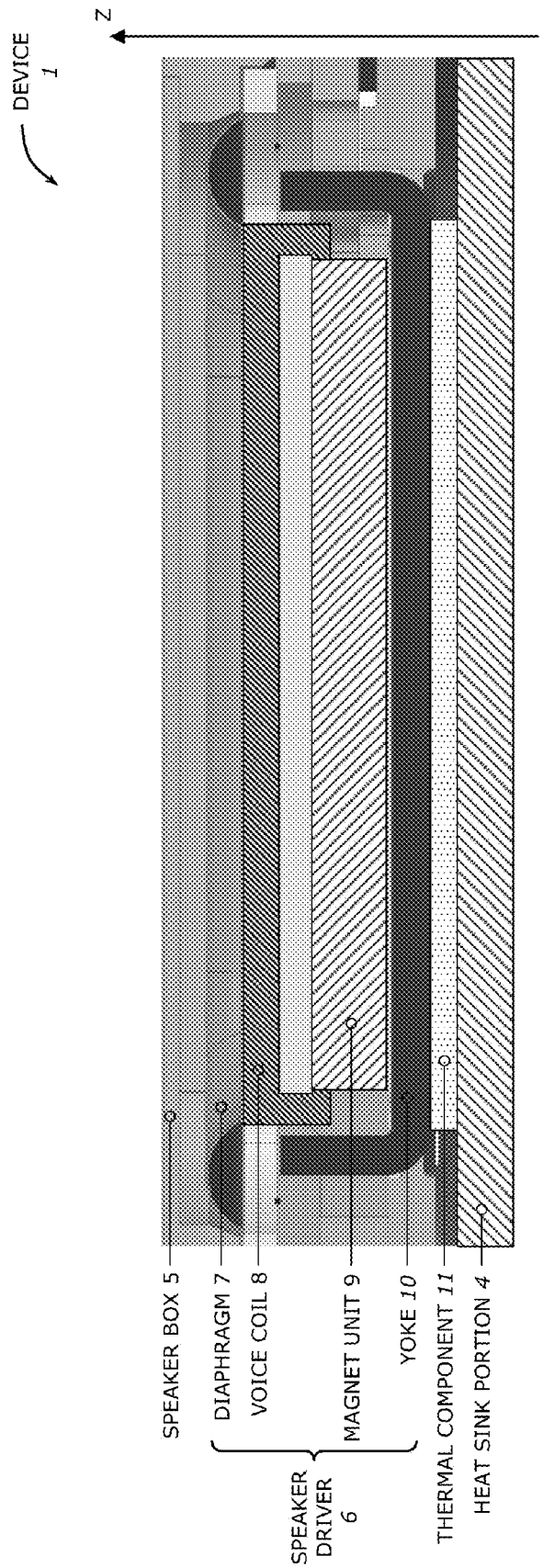
FIG. 3 shows a side view of one embodiment of the consumer electronic device.

FIG. 3 shows a side view of one embodiment of the mobile device. In this embodiment, the mobile device 1 includes the heat sink portion 4 of the housing 2 and the speaker box 5 partially enclosing the speaker driver 6. The heat sink portion 4, as illustrated in FIG. 3, has one face bound to the speaker driver 6 using the thermal component 11 and another face exposed to the exterior of the mobile device 1. The thermal component 11 may be, for example, thermal grease, conductive adhesive or conductive paste.

As shown in FIG. 3, the speaker driver 6 includes a diaphragm 7, a voice coil 8 coupled to the diaphragm 7, the magnet unit 9 and a yoke 10. A top plate may also be included to enhance the magnetic field in the air gap where the voice coil 8 is situated. The diaphragm 7 includes an outer end that may be attached to the frame of the speaker driver 6 or the top plate. The diaphragm 7 acoustically divides the speaker driver 6 into a front volume and a back volume. When audio is played, the back volume communicates with one face of the diaphragm 7 and the other face of the diaphragm 7 channels the sound waves out the speaker port 3. Referring to FIG. 3, the yoke 10 that is made of magnetic material (e.g., iron) is coupled to the magnet unit 9 that includes a permanent magnet. The yoke 10 may be formed in any typical geometrical shape that is used. For instance, the yoke 10 may formed as a circle, a rectangle, or a square. Since the speaker driver 6 is to be used in mobile devices that are constrained in thickness, the combination of the speaker box 5 and the speaker 6 forms a flat speaker such as, for example, a side-firing speaker or a side-ported speaker. In this type of speaker, the diaphragm 7 and the voice coil 8 are both moving in the z-direction and the sound waves are travelling in a direction perpendicular to the z-direction. Referring to FIG. 1, the sound waves exit the mobile device 1 via the speaker port 3 located on the bottom side.

As further illustrated in FIG. 3, the speaker box 5 partially encloses the speaker driver 6 and includes an opening through which one portion of the speaker driver 6 is exposed. As shown in FIG. 3, the yoke 10 that is included in the speaker driver 6 has a portion which is exposed through the opening of the speaker box 5. For audio to be played, current is applied to the speaker driver 6. This causes the voice coil 8 to generate heat which is transferred to the magnet unit 9 to which the voice coil 8 is coupled. The amount of power that may be applied to the speaker box 5 is limited by the resilience of the magnet unit 9 to heat. Overheating any magnet will cause structural or mechanical damage to the magnet and may result in its demagnetization. In order to reduce the heat on the magnet unit 9, the magnet unit 9 is thermally coupled to the heat sink portion 4 of the device housing 2.

Specifically, the portion of the yoke 10 that is exposed though the opening of the speaker box 5 is coupled to the heat sink portion 4 using the thermal component 11. Since the yoke 10 is coupled to the magnet unit 9, the heat on the magnet unit 9 is transferred to the outside of the device 1 via the heat sink portion 4 of the housing 2, the yoke 10, and the thermal component 11. Accordingly, a cooling path is created between the magnet unit 9 and the outside of the device 1. Further, the thermal component 11 binding the yoke 10 to the heat sink portion 4 creates significant thermal mass which also reduces the temperature of the magnet unit 9.

In this embodiment, since the heat on the magnet unit 9 may be reduced, the magnet unit 9 is able to be maintained at a lower temperature than the conventional magnet units. Thus, the magnet unit 9 may include a lower temperature grade magnet and in contrast to the higher temperature grade magnets required to be used in conventional magnet units, the lower temperature grade magnets can store an increased flux density which improves the overall sensitivity of the speaker driver 6.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

FIG. 4 shows a flow diagram of an example method of manufacturing the mobile device that includes a speaker driver having a magnet unit thermally coupled to a thermally conductive portion of the housing of the mobile device. Method 400 begins with partially enclosing a speaker driver that includes a magnet unit in a speaker housing. The partially enclosed speaker driver has one portion exposed from the speaker box (Block 401). The speaker box may include an opening through which the portion of the speaker driver may be exposed. At Block 402, the exposed portion of the partially enclosed speaker driver is bound to a heat sink portion of the housing of a device using a thermal component. Accordingly, the cooling path is established between the speaker driver and the outside of the housing of the mobile device.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A consumer electronics device comprising:
an external housing in which a plurality of electronic components of the device, including a processor, data storage containing an operating system and application software for execution by the processor, a display panel, and an audio codec, are installed, the external housing including a heat sink portion having a higher thermal conductivity than other portions of the external housing, the heat sink portion having a first face and a second face, the second face being exposed to an exterior of the device;
a speaker driver that includes a magnet unit, a diaphragm and a voice coil, wherein the voice coil and diaphragm are coupled to move in a direction parallel to a thickness of the device, wherein sound waves travel in a direction perpendicular to the thickness of the device to exit the device, the speaker driver to be driven by an audio signal from the audio codec; and
a thermal component that binds the speaker driver to the first face of the heat sink portion,
wherein the speaker driver and a speaker box form a side-firing speaker or a side-ported speaker.

2. The device of claim 1, wherein the speaker driver further includes a yoke enclosing the magnet unit.

3. The device of claim 1, wherein the thermal component is one of a thermal grease, a conductive adhesive, and a conductive paste.

4. The device of claim 1, wherein the magnet unit is thermally coupled to the heat sink portion, wherein heat from the magnet unit is transferred using a cooling path, the cooling path being created from the magnet unit to the exterior of the device.

5. The device of claim 1, wherein the magnet unit includes a magnet.

6. The device of claim 1, wherein the device is one of a mobile telephone communications device, a smart phone, a personal digital media player, a tablet computer, a notebook computer, and a compact desktop.

7. A device comprising:
a speaker box including an opening; and
a speaker driver including a diaphragm, a voice coil coupled to the diaphragm, a magnet unit coupled to the voice coil, and a yoke coupled to the magnet unit, wherein the voice coil and diaphragm are coupled to move in a direction parallel to a thickness of the device, wherein sound waves travel in a direction perpendicular to the thickness of the device to exit the device,
wherein the speaker box partially encloses the speaker driver,
wherein one portion of the yoke is exposed through the opening in the speaker box and is coupled to a heat sink portion of a device housing a thermal component, the heat sink having a higher thermal conductivity than the speaker box,
wherein the speaker driver and the speaker box form a side-firing speaker or a side-ported speaker.

8. The device of claim 7, wherein the thermal component is one of a thermal grease, a conductive adhesive, and a conductive paste.

9. The device of claim 7, wherein the magnet unit is thermally coupled to heat sink portion, wherein heat from the magnet unit is transferred using a cooling path, the cooling path being created from the magnet unit to the exterior of the device via the yoke, the thermal component, and the heat sink portion.

10. The device of claim 7, wherein the magnet unit includes a magnet.

11. The device of claim 7, wherein the heat sink portion is a metal plate.

12. The device of claim 7, wherein the device is one of: a mobile telephone communications device, a smart phone, a personal digital media player, a tablet computer, a notebook computer, and a compact desktop.

13. The device of claim 7, wherein the heat sink portion has a first face and a second face, the first face coupled to the one exposed portion of the yoke using a thermal component, the second face exposed to the exterior of the mobile device.

14. A method comprising:
partially enclosing a speaker driver in a speaker box, the partially enclosed speaker driver having one portion exposed from the speaker box, wherein the speaker driver includes a magnet unit, a diaphragm and a voice coil, wherein the voice coil and diaphragm are coupled to move in a direction parallel to a thickness of the speaker box, wherein sound waves travel in a direction perpendicular to the thickness of the speaker box; and
binding using a thermal component the exposed portion of the partially enclosed speaker driver to a heat sink portion of a housing of a device,
wherein the speaker driver and the speaker box form a side-firing speaker or a side-ported speaker.

15. The method of claim 14, wherein the thermal component is one of a thermal grease, a conductive adhesive, and a conductive paste.

16. The method of claim 14, wherein the magnet unit is thermally coupled to the heat sink portion, wherein heat from the magnet unit is transferred using a cooling path, the cooling path being created from the magnet unit to an exterior of the device.

17. The method of claim 14, wherein the magnet unit includes a magnet.

18. The method of claim 14, wherein the device is one of a mobile telephone communications device, a smart phone, a personal digital media player, a tablet computer, a notebook computer, and a compact desktop.

19. The method of claim 14, further comprising:
creating the speaker box using plastic material and including an opening in the speaker box,
wherein the exposed portion of the partially enclosed speaker driver is exposed through the opening.

20. The method of claim 19, wherein the exposed portion of the partially enclosed speaker driver is a portion of a yoke that is included in the speaker driver and that is coupled to the magnet unit.

21. The method of claim 20, wherein the heat sink portion is made of metal and the yoke is made of a magnetic material.

* * * * *